United States Patent [19]
Steltz

[11] 3,756,438
[45] Sept. 4, 1973

[54] POWER-OPERATED TAIL GATE AND PACKER PLATE FOR REFUSE DUMP TRUCKS

[75] Inventor: Douglas C. Steltz, Waukesha, Wis.
[73] Assignee: Portec, Inc., Oak Brook, Ill.
[22] Filed: Oct. 28, 1971
[21] Appl. No.: 193,333

[52] U.S. Cl. .............................................. 214/83.3
[51] Int. Cl. .............................................. B65f 3/00
[58] Field of Search.................... 214/83.3, 503, 504

[56] References Cited
UNITED STATES PATENTS
2,212,058  8/1940  Wood ............................... 214/83.3

Primary Examiner—Albert J. Makay
Attorney—Emory L. Groff et al.

[57] ABSTRACT

A refuse dump truck body is equipped with a tail gate which is hinged to the top of the body and raised and lowered by a power cylinder at the top of the body. The tail gate is swingable on its hinge axis. Latching means secure the lower end of the tail gate releasably to the dump body so that the tail gate normally covers the upper portion of the rear dump body opening. A refuse packer plate is hinged to the lower end of the tail gate and operated by power cylinders on the tail gate and is adapted to enter the lower portion of the dump body rear refuse receiving and discharge opening.

3 Claims, 2 Drawing Figures

PATENTED SEP 4 1973 3,756,438

INVENTOR
DOUGLAS C. STELTZ
BY Emory L. Groff
ATTY

POWER-OPERATED TAIL GATE AND PACKER PLATE FOR REFUSE DUMP TRUCKS

A problem arises in connection with refuse dump trucks when the densely packed contents of the truck body must be dumped into a larger rear loading mother truck or on the ground at a land fill site. The somewhat restricted opening at the rear of the truck body into which the packer door or plate fits frequently will not allow free passage of the compacted refuse. One effort to deal with this troublesome problem is disclosed in prior U.S. Pat. No. 3,554,398, wherein a large packer plate hingedly mounted at the top of the dump body is adapted to swing through a wide arc to a full open position where the discharge of compacted refuse is not restricted. However, the movement of the large packer plate through an arc of 180° or more presents additional problems which include the necessity for power cylinders which have a very long stroke, rendering them costly and subject to leakage. Additionally, quite long and awkward crank arms to operate the packer plate are required and therefore the prior art structure while operative possesses some major disadvantages. Accordingly, an objective of this invention is to improve upon the prior art and to provide an alternative therefor which is more practical, economical and reliable in operation and also less cumbersome.

According to the present invention, the large opening at the rear of the dump body extending from the top to the bottom thereof is covered in the upper region by an inclined tail gate which is vertically swingable upon a transverse horizontal hinge axis at the top of the body and at the rear thereof. The tail gate is raised and lowered by a single power cylinder mounted on the top wall of the dump body at the transverse center thereof. A pair of manually releasable latches on the opposite sides of the tail gate at its lower end are capable of rigidly and releasably locking the tail gate in the lowered refuse containing position where the tail gate covers and closes the upper portion of the dump body opening. A packer plate hingedly mounted on the lower end of the tail gate is adapted to enter the lower portion of the dump body rear opening to compact refuse therein and to retain such refuse until dumping is required. The packer plate is independently operable on its transverse horizontal hinge axis by power cylinder means mounted on the tail gate and preferably comprising a pair of power cylinders near the opposite sides of the tail gate. The arrangement allows for the provision of a normal somewhat restricted rear opening for the reception and the packing of refuse, and subsequently a much wider discharge opening which allows dumping of the refuse without encountering the stated difficulties of the prior art.

Other features and advantages of the invention will become apparent during the course of the following description.

BRIEF DESCRIPTION OF DRAWING FIGURES

DETAILED DESCRIPTION

Figure 1:
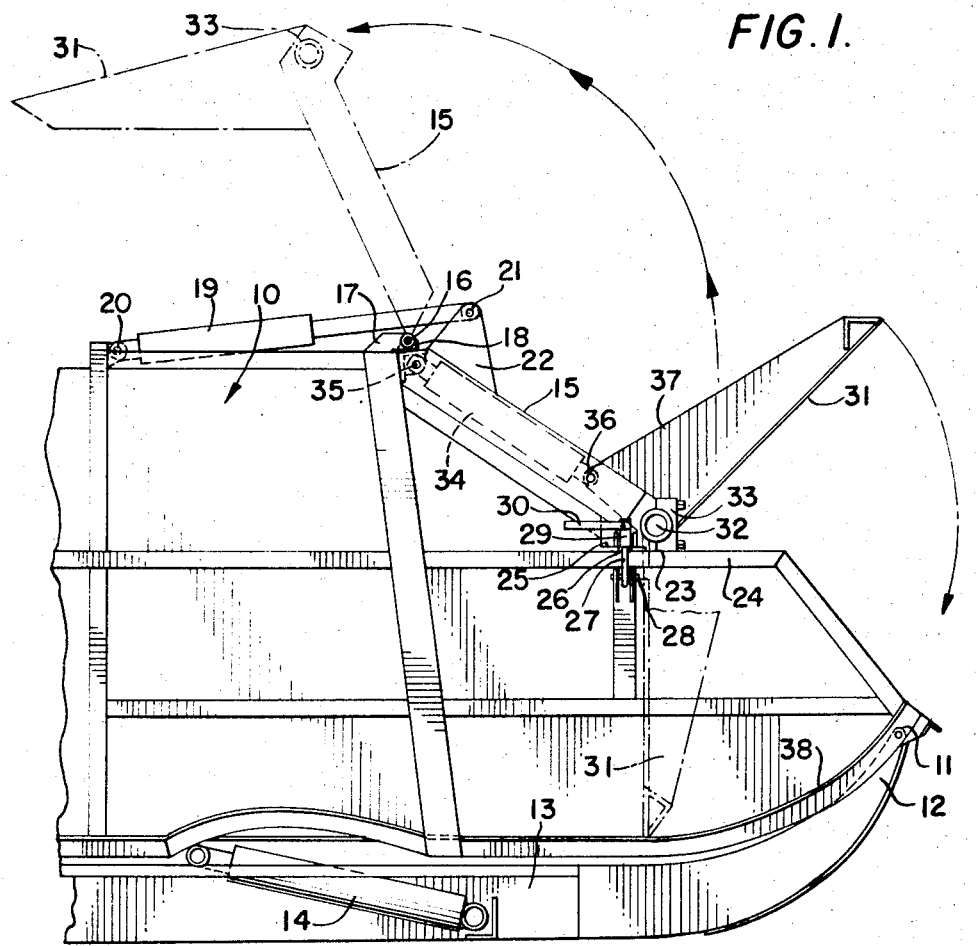
FIG. 1 is a fragmentary side elevation of a refuse dump truck body having the power-operated tail gate and packer plate and operating means in accordance with the invention.

Referring to the drawings in detail wherein like numerals designate like parts, the numeral 10 designates generally the dump body of a refuse truck of the general type disclosed in U.S. Pat. No. 3,554,398 to Ronald W. Nickel. As disclosed in this patent, the dump body 10 has bottom, top and side walls and is open at its rear end. The lower rear extremity of the body 10 is hingedly secured to a transverse horizontal hinge pin 11 carried by the tops of rear upwardly curved extension arms 12 of the main frame 13 of the refuse truck. A centrally located single dump body operating power cylinder 14 is coupled between the main frame 13 and the bottom of the dump body 10 as shown in said prior patent to allow raising and lowering of the dump body by pivoting it upon the axis of the hinge pin 11.

The present invention proper comprises a rectangular tail gate 15 which spans the upper portion of the rear open end of the dump body 10. The upper end of the tail gate 15 is hingedly connected to the upper rear terminal of the dump body by a pair of hinges 16 near the opposite sides of the tail gate and body. These hinges, as shown, comprise short pins which hingedly interconnect lugs 17 on the top of the dump body with coacting lugs 18 of the tail gate.

The tail gate 15 is raised and lowered on the axes of the hinges 16 preferably by a single power cylinder 19 at the transverse center of the dump body 10. This cylinder 19 is mounted immediately above the roof of the body 10 and has its cylinder end pivoted at 20 to the body 10 and its rod end pivoted at 21 to elevated plates 22 rising from the tail gate 15 and rigid therewith.

Figure 2:
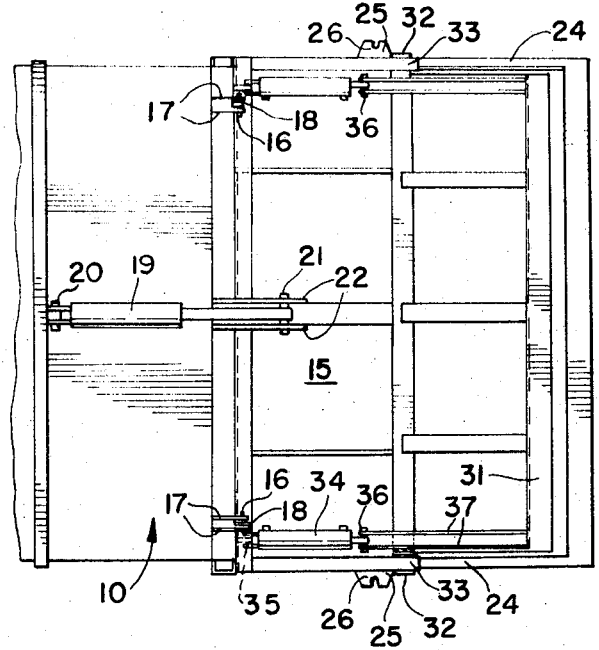
FIG. 2 is a fragmentary plan view of the apparatus in FIG. 1.

The tail gate 15, when in a closed normal position, is inclined as shown in full lines in FIG. 1 and covers the upper portion, approximately one-half of the rear opening of the dump body. When in such closed position, the tail gate has horizontal faces 23 at its opposite sides which rest upon side horizontal ledges 24 on the opposite side walls of the dump body 10. Horizontal locking plates 25 having slots 26 project outwardly from the sides of the tail gate 15 and are rigidly secured to the tail gate. These locking plates also project somewhat outwardly of the ledges 24 and the side walls of the body 10, FIG. 2. Latch bolts 27 are pivotally secured at 28 to the opposite side walls of the body 10 and, when swung upwardly to tail gate locking positions, FIG. 1, enter the slots 26 of plates 25. Clamping or locking nuts 29 having threaded engagement with the tops of the bolts 27 and having operating handles 30 engage above the plates 25 to securely and releasably lock the tail gate 15 in the down inclined position shown in full lines in FIG. 1. When the tail gate locking means are released, the cylinder 19 may be operated to elevate the tail gate to the standing position shown in broken lines in FIG. 1. This allows free and unrestricted dumping of the compacted refuse from the truck and overcomes jamming of refuse in a more restricted opening.

The invention further embodies a rigid packer plate or door 31 which is vertically swingable and adapted to cover the lower portion of the rear truck discharge opening. The packer plate is pivotally mounted upon the lower end of the tail gate 15 through trunnions 32 which are journaled in bearings 33 on the opposite sides of the tail gate. The packer plate 31 is raised and lowered preferably by a pair of power cylinders 34 mounted on the tail gate 15 near the opposite sides thereof. These cylinders are connected at 35 with the top of the tail gate and their rod ends are connected at 36 with gusset plates 37 on the packer plate forming short crank arms. FIG. 1 shows the packer plate 31 in a fully raised position well above the horizontal and extending nearly at right angles to the closed tail gate 15. By operating the cylinders 34 in unison, the packer plate may be swung downwardly on the axes of trunnions 32 and will enter the rear lower portion of the refuse truck body 10 to compact refuse therein generally in the manner well known in the prior art. The packer plate 31 will travel to a substantially vertical compacting position within the truck body as depicted in FIG. 1. In so doing, the packer plate sweeps over an upwardly curved rear terminal portion 38 of the dump truck body. Refuse is loaded into the dump body when the packer plate is in the full line raised position as shown in FIG. 1.

OPERATION

When refuse is being loaded into the body 10, the body is down in a level position on the main frame 13, the tail gate 15 is locked down and the packer plate 31 is elevated as shown in FIG. 1. In order to compact the refuse in the body 10, the two cylinders 34 are operated through conventional hydraulic controls, not shown, to lower the packer plate to approximately the down position shown in FIG. 1. When the body 10 is full of compacted refuse and requires emptying at a land fill site, dump or into a larger truck, the latch bolts 27 are released by operating the handles 30 of clamping nuts 29, the power cylinder 19 is retracted by the use of conventional hydraulic controls and the tail gate 15 along with the packer plate 31 mounted thereon is elevated to the full open position shown in broken lines in FIG. 1. This clears the entire rear opening of the truck from top to bottom and side wall to side wall for the unrestricted dumping of refuse after the body 10 is elevated to the dumping position by means of the cylinder 14, substantially as shown in prior U.S. Pat. No. 3,554,398. Were it not for the raising of the tail gate 15 to enlarge the discharge opening, the compacted refuse would tend to clog up in the more restricted opening below the tail gate occupied by the packer plate. The advantages of the construction over the prior art, its practicality and economies should now be apparent to those skilled in the art without the need for further description herein.

It is to be understood that the form of the invention herewith shown and described is to be taken as a preferred example of the same and that various changes in the shape, size and arrangement of parts may be resorted to, without departing from the spirit of the invention or scope of the subjoined claims.

I claim:

1. In a refuse collection and dump truck, an enclosed dump truck body adapted to receive refuse while in a level position and to discharge the refuse after being elevated to a dumping position, said body being open at its rear end, a tail gate pivoted about its upper end to the rear of said body and being vertically swingable and adapted to span and enclose an upper portion of the open rear end of said body, abutment means on said body contacting the bottom of the tail gate when the latter is in a down closed position, the tail gate being inclined in its down closed position and having a level abutment face then contacting the abutment means, power means for raising and lowering the tail gate, means to releasably lock the tail gate in a down closed position on said body, said means comprising manually operable mechanical locking means on the tail gate and said body, said locking means comprising slotted locking plates on the opposite sides of the tail gate and projecting outwardly therefrom, pivoted locking bolts on said body adapted to enter the slots of said plates, and threaded clamping nuts on said bolts adapted when tightened to bear against the tops of said locking plates, a packer plate hingedly secured to the lower end of the tail gate and being vertically swingable relative to the tail gate and body and adapted to enter and cover the lower portion of the rear open end of the body and to compact refuse therein, and additional power means connected with the packer plate to operate the same independently of the tail gate, the first-named power means being operable to raise and lower the packer plate with the second-named power means with the tail gate.

2. The structure of claim 1, and said first-named power means for raising and lowering the tail gate comprising an extensible and retractable fluid pressure operated power cylinder on the top of said body having a connection with the tail gate at a point spaced from the pivot of the tail gate.

3. The structure of claim 1, and said additional power means comprising a pair of extensible and retractable fluid pressure operated power cylinders mounted bodily on the tail gate and having connections with the packer plate at points spaced from the hinge axis of the packer plate, whereby the packer plate may be swung vertically relative to the tail gate and may be raised and lowered with the tail gate.

* * * * *